(12) United States Patent
Tharp et al.

(10) Patent No.: US 8,758,620 B2
(45) Date of Patent: Jun. 24, 2014

(54) DECANTED BIO-BALANCED REACTOR AND METHOD

(75) Inventors: Charles E. Tharp, Columbia, MO (US); Randall C. Chann, Columbia, MO (US)

(73) Assignee: Environmental Dynamics International, Inc., Columbia, MO (US)

( * ) Notice: Subject to any disclaimer, the term of this patent is extended or adjusted under 35 U.S.C. 154(b) by 0 days.

(21) Appl. No.: 13/448,537

(22) Filed: Apr. 17, 2012

(65) Prior Publication Data

US 2013/0270182 A1    Oct. 17, 2013

(51) Int. Cl.
*C02F 3/06* (2006.01)
*C02F 3/02* (2006.01)
*C02F 3/30* (2006.01)

(52) U.S. Cl.
USPC ........ 210/615; 210/620; 210/630; 210/747.5; 210/747.9

(58) Field of Classification Search
USPC .......................... 210/615, 620, 601, 605, 630
See application file for complete search history.

(56) References Cited

U.S. PATENT DOCUMENTS

| | | | |
|---|---|---|---|
| 5,554,289 A * | 9/1996 | Grounds | 210/607 |
| 5,736,047 A * | 4/1998 | Ngo | 210/602 |
| 6,905,602 B1 * | 6/2005 | Dobie et al. | 210/605 |
| 7,097,767 B2 * | 8/2006 | Gunderson, III | 210/615 |
| 7,713,415 B2 * | 5/2010 | Tharp et al. | 210/605 |
| 2003/0136731 A1 | 7/2003 | Mandt | |
| 2007/0119763 A1 | 5/2007 | Probst | |
| 2009/0261027 A1 | 10/2009 | Elefritz, Jr. et al. | |
| 2012/0152832 A1 * | 6/2012 | Johnson et al. | 210/615 |

* cited by examiner

*Primary Examiner* — Nam Nguyen
*Assistant Examiner* — Claire Norris
(74) *Attorney, Agent, or Firm* — Husch Blackwell LLP (57) ABSTRACT

A wastewater treatment system is provided having a reactor, first and second bio media and an aeration system. The first bio medium is located proximate an inlet end of the reactor and extends vertically between a top water level and the reactor's floor. The second bio medium is located proximate an outlet end of the reactor and extends vertically between a bottom water level and the reactor's floor. The media are adapted for retaining solids within the reactor as clarified water is withdrawn after treatment. The first bio media is further adapted to act as a baffle thereby causing wastewater to flow generally uniformly into a primary reactor zone. The aeration system includes a plurality of diffusers, some of which may be located adjacent or underneath the bio media and are adapted for promoting the shaking the bio media when activated in order dislodge excessive biomass therefrom.

27 Claims, 6 Drawing Sheets

DECANTED BIO-BALANCED REACTOR AND METHOD

CROSS-REFERENCE TO RELATED APPLICATIONS

None.

BACKGROUND OF THE INVENTION

Water and wastewater are commonly treated using a variety of techniques. Many conventional municipal and industrial wastewater treatment plants utilize lagoon technologies in treating wastewater. In many cases, these lagoon technologies are advantageous over alternative options because they require only minimal operator attention, they can be operated by a lower class operator and they require only a relatively small amount of mechanical equipment. Additionally, lagoon technologies are typically capable of minimizing sludge handling procedures.

However, some wastewater treatment systems utilizing lagoons are not without disadvantages. Regulatory agencies, such as the United States Environmental Protection Agency (EPA), have imposed regulations requiring increased nitrification in the treatment of wastewater. In many lagoon-type systems, nitrification sufficient for meeting these increased standards typically only occurs in warm temperatures. However, in many geographical locations, including the northern half of the United States, as the ambient temperature drops during the fall and winter months, the nitrification rate within the lagoons drops to such a low rate that not all of the nitrogen contained within the wastewater entering the lagoons is treated.

Thus, a need exists for a wastewater treatment system and method capable of utilizing and adapting existing lagoon technology such that enhanced or advanced lagoon technology is capable of meeting the increased nitrification and denitrification standards imposed by regulatory agencies. Additionally, a need exists for a lagoon-based wastewater treatment system that has increased treatment and filtration solids management capabilities to reduce the wastewater's solids content, biological oxygen demand and nitrogenous content. A further need exists for an improved wastewater treatment system that includes multiple treatment zones and baffling between those zones.

SUMMARY OF THE INVENTION

The present invention is directed to a wastewater treatment system that includes a vessel or reactor for containing a liquid such as wastewater, first and second bio media and an aeration system. The first and second bio media may each be a permeable hydraulic barrier and bio filtration device adapted for hosting a major fixed film biomass and allowing the wastewater to flow therethrough while generally preventing solids from passing therethrough. The first and second bio media may each be a rigid media, a flexible media or a combination thereof. The media are characterized by their ability to promote the growth and accumulation of microbes and/or complex biomass thereon while allowing flow of wastewater through the media.

The first bio medium is located proximate an inlet end of the reactor and is generally submerged and extending horizontally substantially between the reactor's left and right sidewalls and extending vertically substantially between a top water level and the reactor's floor. As such, the first bio medium is adapted so that the wastewater may not short circuit around the bio media and instead must pass therethrough. The first bio medium may be configured for acting as a bio baffle, causing wastewater to flow generally uniformly therethrough as the wastewater is transferred into a primary reactor zone. The primary bio baffle serves to control the flow distribution of the wastewater, perform fixed film bio treatment seeding waste for treatment in secondary zones, retain primary solids and enhance bio flocculation of minute particles in the wastewater.

The second bio medium is located proximate an opposite outlet end of the reactor and is generally submerged and extending horizontally substantially between the reactor's left and right sidewalls and extending vertically substantially between a bottom water level and the reactor's floor. As such, the second bio medium is adapted such that the wastewater is required to either flow over it or pass therethrough. The secondary bio media serves to direct clear treated water out of the reactor from the surface, act as a bio filtration for microscopic particles, retain sludge in the active zone between the two bio media and act as a final stage nitrification/denitrification zone just prior to discharge.

In one embodiment, the reactor includes a selector zone located between the reactor inlet end and the first bio medium, a primary reactor zone located between the first bio medium and said second bio medium and a discharge or decanter zone located between the second bio medium and the outlet end.

The aeration system may comprise a plurality of submerged diffusers. In one embodiment, at least one of the diffusers is located near or underneath the first and/or second bio media and is adapted for promoting the shaking or flexing of the bio media when activated in order to dislodge excessive biomass therefrom, thus preventing the bio media from accumulating excessive biomass, clogging unduly and inhibiting the flow and treatment of wastewater therethrough.

In a method utilizing the wastewater system, influent wastewater is introduced into the reactor during a fill phase. In one embodiment, the influent wastewater is introduced in a substantially continuous manner The wastewater passes through the first bio medium and is retained in the primary reactor zone. During an aeration phase, aerators may be activated so as to aerate and mix the wastewater to reduce the biological oxygen demand of the wastewater and convert at least a portion of nitrogenous components in the wastewater to nitrate or nitrite components. The wastewater is then maintained in a quiescent state without aeration to allow solids contained therein to settle towards the bottom of the reactor. During the settling phase and solids separation, a highly treated and clarified upper layer and a stratified lower layer containing mixed liquor suspended solids (MLSS), including treatment microorganisms, are formed. During a decanting phase, the primary discharge of treated wastewater is passed over the second bio medium and is then discharged from the reactor via a decanter or other outlet device. A modest amount of the effluent discharged may pass through the second bio medium. The second bio medium is adapted for retaining settled solids within the primary reactor zone and/or trapping flocculated solids passing through the bio medium as the decanter is withdrawing the treated wastewater from the reactor.

Other and further objects of the invention, together with the features of novelty appurtenant thereto, will appear in the course of the following description.

BRIEF DESCRIPTION OF THE SEVERAL VIEWS OF THE DRAWING

In the accompanying drawings, which foam a part of the specification and are to be read in conjunction therewith in which like reference numerals are used to indicate like or similar parts in the various views.

DETAILED DESCRIPTION OF THE PREFERRED EMBODIMENTS

The present invention relates generally to the field of treatment of wastewater, and more particularly to an improved system and method for treating wastewater containing contaminants The system and method can be employed to reduce the solids content, biological oxygen demand (BOD) and nitrogen content of wastewater. It may be implemented in new lagoons, concrete structures or other systems or may be implemented to upgrade existing concrete structures or earthen basin and lagoon type structures in order to bring those systems in conformance with regulations imposed by governmental bodies.

Figure 1:
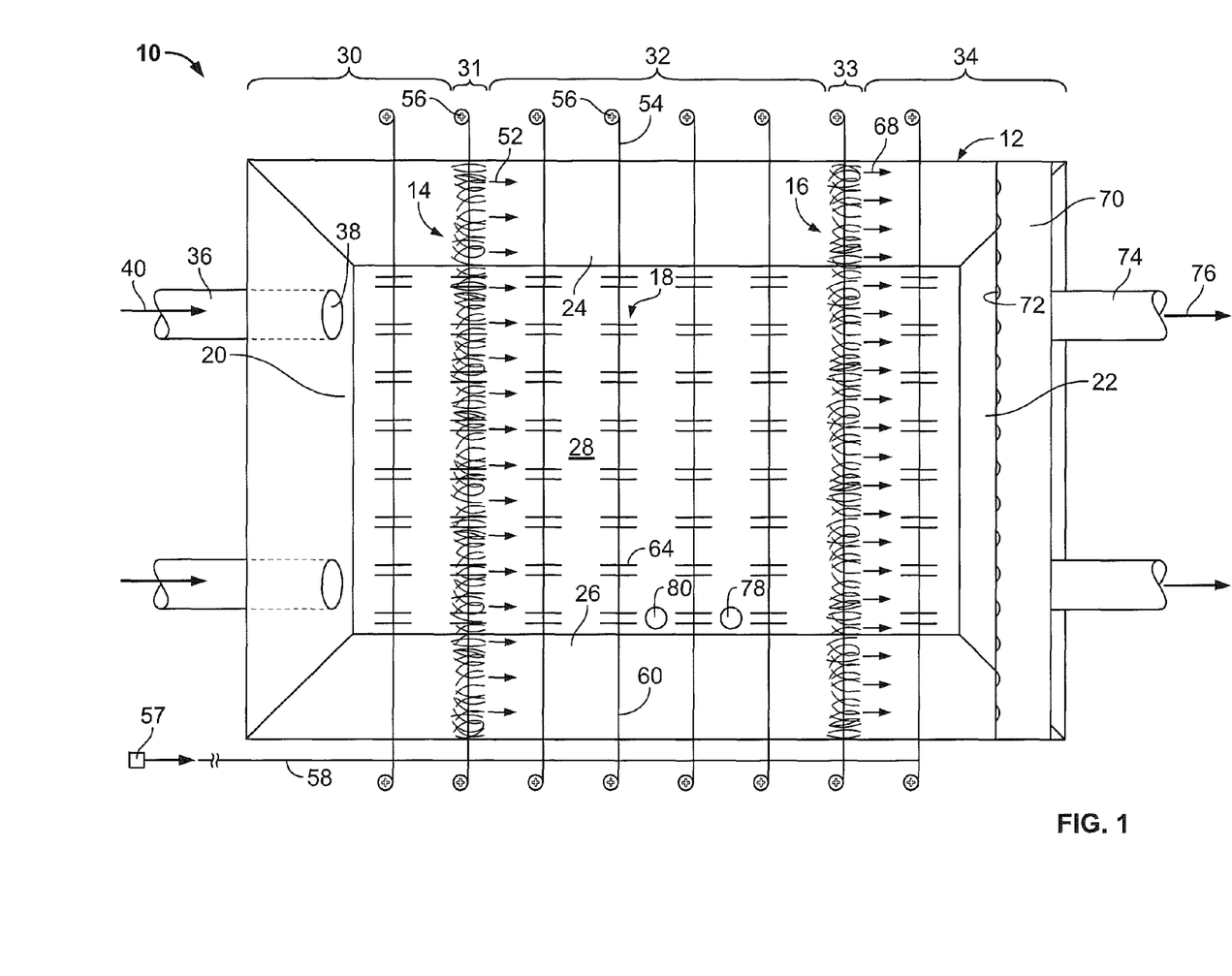
FIG. 1 is a plan view of a wastewater treatment system in accordance with one embodiment of the present invention.

Referring now to the drawings and initially to FIG. 1, numeral 10 generally designates a wastewater treatment system that includes, among other things, a reactor 12 for containing and treating a liquid such as wastewater, first and second bio media 14 and 16 and an aeration system 18. As will be discussed in greater detail below, the first and second bio media 14 and 16 are adapted and positioned for retaining settled solids within the reactor as treated wastewater with withdrawn from the reactor.

The reactor 12 may take the form of a lagoon, basin, pond, tank or other containment vessel. The reactor 12 may be constructed of concrete, earth, metal, plastic, natural or synthetic lining materials or combinations thereof. As shown, the reactor 12 includes a first or inlet end 20, a second or outlet end 22, a left side 24, a right side 26 and a generally flat bottom or floor 28. As is typical with a lagoon, the reactor 12 can include inwardly sloping walls associated with its ends 20 and 22 and sides 24 and 26. As will be discussed in more detail below, the reactor 12 comprises multiple chambers or zones through which the liquid flowing therethrough must pass during its treatment. The reactor 12 includes an inlet, which may comprise a pipe or conduit 36 forming an inlet opening 38, for introducing wastewater to the reactor 12 in an influent stream as depicted by arrow 40. The inlet opening 38 is generally proximate the inlet end 20 of the reactor and may be located near the floor 28, as shown in FIGS. 2-5.

The first and second bio media 14 and 16 are submerged in the liquid contained in the reactor 12. The bio media 14 and 16 should each create a permeable or porous hydraulic barrier so as to allow the liquid to flow therethrough. As such, the bio media 14 and 16 may be biological flocculation and filtering devices that are adapted to generally provide fixed film treatment and prevent solids from passing therethrough while still allowing liquids to flow therethrough.

The bio media 14 and 16 may be rigid or fixed media, a flexible media or a combination thereof The bio media 14 and 16, whether rigid or flexible, should provide a material and surface area suitable for effectively promoting the accumulation and growth of microbes thereon in a sufficient quantity to create a fixed film environment for treating the wastewater or other liquid that is undergoing treatment. When the bio media 14 and 16 includes rigid media, it may be in the form of film, sheets, disks, blocks, matrices or honeycombs and may be made of polythene, polyvinyl chloride (PVC), expanded polystyrene, natural or synthetic materials, as well as a wide variety of other materials. When the bio media 14 and 16 includes flexible media, it may be in the form of film, sheets or clusters of strips such as described in U.S. Pat. No. 7,713, 415 to Tharp, et al. and marketed by Environmental Dynamics International, Inc. under the BioReef® or BioCurtain™ names. The entire disclosure of U.S. Pat. No. 7,713,415 to Tharp, et al. is hereby incorporated by reference.

Figure 6:
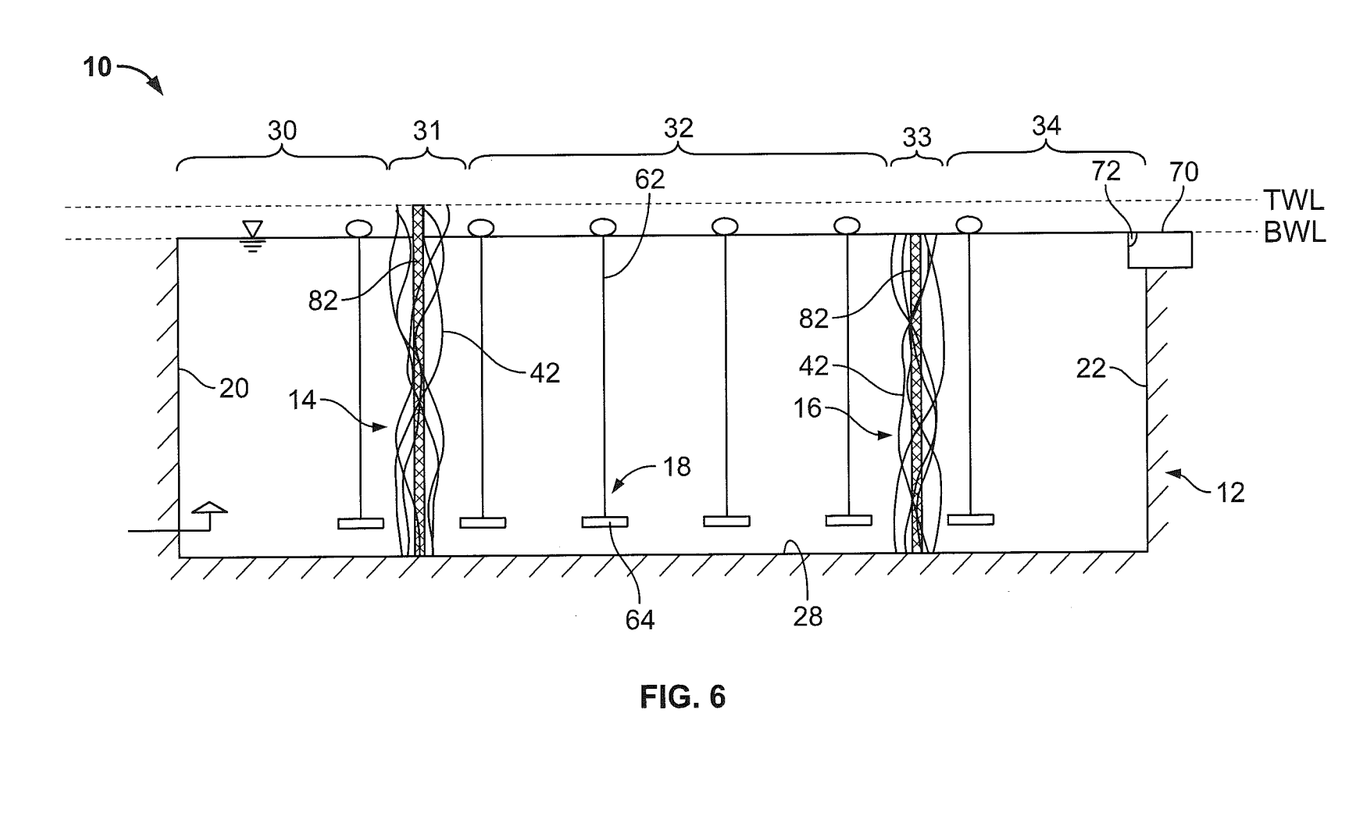
FIG. 6 is a cross sectional side view of a wastewater treatment system having generally vertical end walls and side walls in accordance with one embodiment of the present invention.
Figure 7:
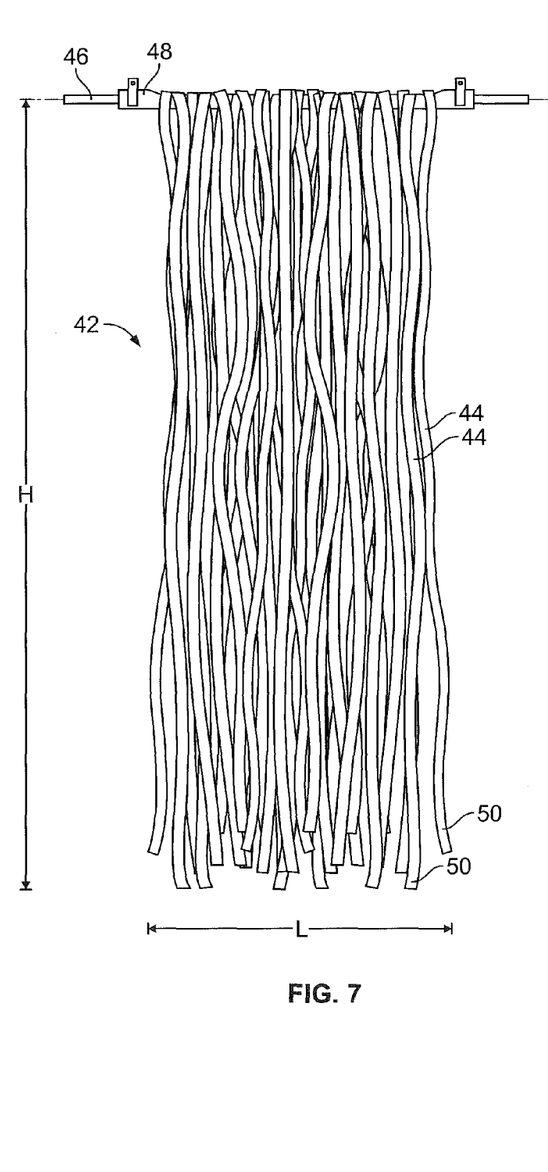
FIG. 7 is a front elevational view of a submerged bio media formed of a plurality of flexible strips arranged in a cluster in accordance with one embodiment of the present invention.
Figure 8:
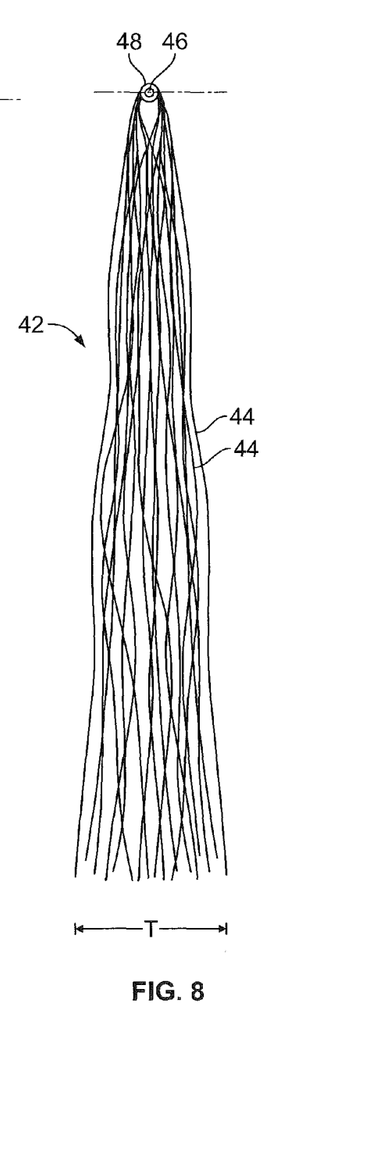
FIG. 8 is a side elevational view of the media shown in FIG. 7.
Figure 9:
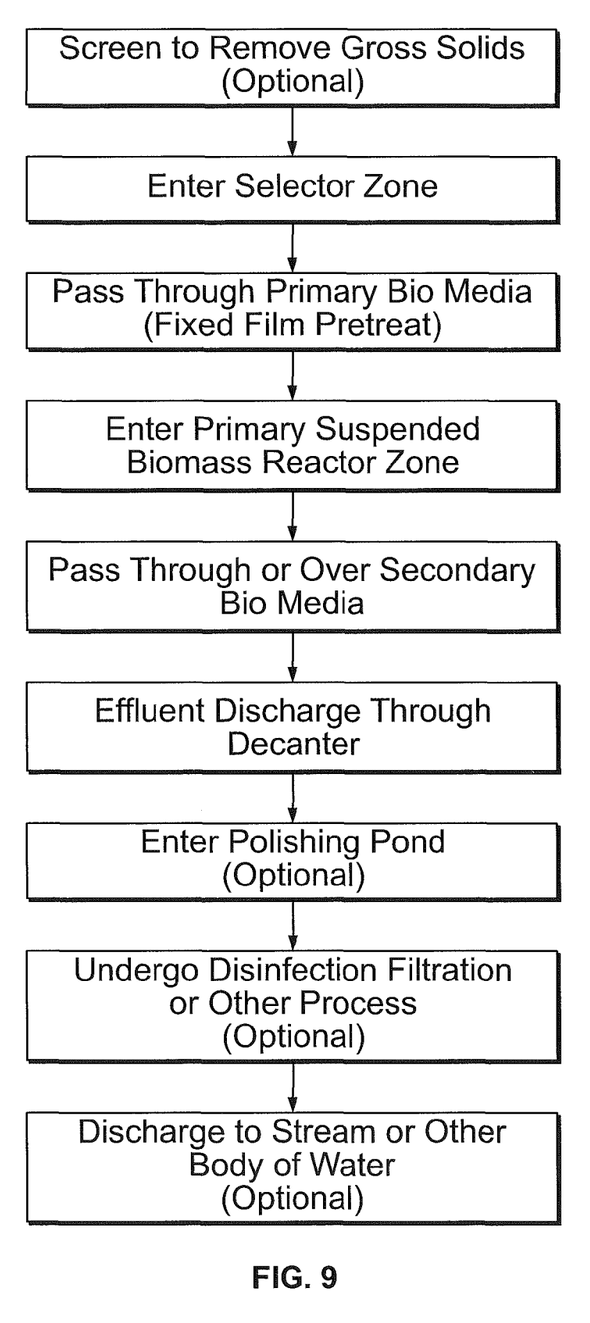
FIG. 9 is a block diagram of the steps included in a method of treating wastewater in accordance with one embodiment of the present invention.

In one embodiment, the flexible bio media 14 and 16 are in the form of one or more clusters 42 constructed of a plurality of individual ribbons or strips 44 bunched together to form the clusters, as illustrated in FIGS. 7 and 8. The strips 44 may be less than two inches wide. The strips 44 can be supported from a support structure that includes a pipe or float 48 sleeved over a rope or cable 46 stretched across the reactor 12 at heights described below and secured with suitable anchors 56. With additional reference to FIGS. 6 and 7, the strips 44 are folded over the cable 46 or pipe 48 and secured thereto in any suitable manner. The strips 44 have free ends 50 which are submerged into the liquid and are unattached so that the strips 44 are free to flex or flutter.

As shown, the strips 44 are preferably arranged closely together along a length dimension L of one or more clusters 42. Each cluster 42 has a thickness dimension T that is preferably at least one inch thick and may be up to three feet thick or more in some applications. In any event, the thickness T should be substantial so that the liquid that is being treated will be exposed to a significant biomass contained on a relatively large number of strips 44 as the liquid passes through the thickness T. The bunching of the strips 20 throughout the thickness dimension T also arranges the strips such that they create a baffling effect to increase the distribution and exposure of the liquid to the surfaces of the discrete strips 20 as the liquid passes through the thickness dimension T.

While FIGS. 2-5 show that the bio media 14 and 16 each include a rigid bio media 82 and clusters of flexible bio media 42, it will be appreciated that the bio media 14 and 16 need not include both types and may comprise one of a rigid bio media 82 or flexible bio media 42.

As depicted in FIG. 1, the bio media 14 and 16 extend horizontally between the left and right sides 24 and 26 of the reactor 12. The bio media 14 and 16 each form a substantially continuous curtain across the entire width of the reactor 12. In doing so, the bio media 14 and 16 may extend to and contact the sidewalls of the reactor 12 so that the liquid being treated cannot short circuit around the bio media 14 and 16, but rather will pass therethrough.

As mentioned above, the bio media 14 and 16 are fully or partially submerged in the liquid being treated within the reactor and are positioned at certain heights, as illustrated in FIGS. 2-5. The first bio media 14 extends generally vertically from a position at or above the top water level TWL to a position at or near the reactor's floor 28. Thus, all of the wastewater or other liquid being treated must pass through the first bio media 14. The wastewater is exposed to the microbial biomass that grows and accumulates on the individual strips 44 or other elements of the bio media such that the microbes are able to treat, flocculate and/or remove suspended and soluble solids from the wastewater. The second bio media 16, however, extends generally vertically from a position at or near the bottom water level BWL to a position at or near the reactor's floor 28. As will be discussed in more detail below, the position and placement of the second bio media 16 permits the reactor to discharge treated liquid while retaining the bio solids that have been generated during aeration, then separated by settling from the treated liquid.

As illustrated in the figures, the system 10 includes five zones, namely, a pre-react or selector zone 30, a first bio media zone 31, a primary reactor zone 32, a second bio media zone 33 and a discharge or decanter zone 34. However, other embodiments, including those that comprise more that two bio media zones, may have more than five zones. The selector zone 30 is generally defined between the reactor first end wall 20 and the first bio media 14. The first bio media zone 31 is located within the first bio media 14. The primary reactor zone 32 is generally defined between the first bio media 14 and the second bio media 16. The second bio media zone 33 is located within the second bio media 16. The decanter zone 34 is generally defined between the second bio media 16 and the reactor second end wall 22.

The selector zone 30 may, during all or part of the liquid treatment process, be operated in an anoxic or anaerobic condition (with little to no aeration). As such, the selector zone 30 may be adapted for providing a denitrification environment for sludge and mixed liquor suspended solids (MLSS). However, during other parts of the treatment process, the selector zone 30 may be operated in an oxic or aerobic condition. The barrier nature of the first bio media 14 has the benefit of retaining gross solids within the selector zone 30 for continued breakdown and treatment thereby maximizing the performance of the reactor 12. The selector zone 30 may comprise between approximately 5% and 50% of the overall reactor 12.

In one embodiment, the inlet sector zone 30 is of sufficient size to allow continuous influent wastewater flow into the reactor 12 even during the decanting phase. In this embodiment, the selector zone 30 is of a large enough size and the first bio media 14 acts as a baffle to provide hydraulic distribution of the wastewater into the primary reactor zone 32 such that decanting can occur over a relatively short period of time without drawing liquid from the selector zone 30 to the outlet end 22. This provides a benefit over other previous treatment systems in that that the influent flow to the reactor may be continuous and need not be stopped during the treatment cycle. When influent flow is stopped, a storage or balance tank is generally necessary in order to hold the influent until it may be released into the reactor 12. Thus, in this embodiment of the present invention where the influent flow is continuous, no storage or balance tank is required.

The first bio media zone 31 is the zone occupied by the first bio media 14. This zone 31 acts as a permeable or porous hydraulic barrier. Again, as the wastewater passes through this zone, it is exposed to the microbial biomass that grows and accumulates on the individual strips 44 or other elements of the first bio media 14 such that the microbes are able to remove suspended and soluble solids from the wastewater. The first bio media 14 and zone 31 provide a baffling effect which directs the wastewater from strip to strip to increase the exposure and contact time of the liquid with the biomass. In one embodiment, this baffling effect causes the wastewater to flow generally uniformly from the selector zone 30 to the primary reactor zone 32. As such, the first bio media 14 is able to dampen peak flows, as an adjustment. Depending upon various factors, including the thickness of the first bio media 14, the flow through the first bio media may be oxic, anoxic, anaerobic and/or aerobic. The first bio media zone 31 may, at least partially, be in an anoxic condition thereby providing a denitrification environment for the sludge and returned MLSS.

In one embodiment, the first bio media 14 are arranged in the first bio media zone 31 such that an upper portion of the zone 31 is of a higher density of media 14 and a lower portion of the zone 31 is of a lower density of media 14 in order to allow most of the wastewater to pass into the primary reactor zone 32 near the bottom of the reactor 12. Such an embodiment keeps the influent flow at a point under or into the sludge layer that typically settles near the bottom 28 of the reactor 12 during the settling and decant phases. The flow of the wastewater through the sludge layer is effective in treating the wastewater and preventing escape of waste during the decant phase, which removes clarified liquid off the top of the body of liquid in the reactor 12.

The primary reactor zone 32 is the zone in which the majority of the solids remaining in the wastewater upon passing through the first bio media 14 will settle. The primary reactor zone 32 may comprise between 30% and 90% of the overall reactor 12. The primary reactor zone 32 may include an outlet and a waste activated sludge (WAS) pump 78 for removing waste sludge and MLSS from the primary reactor zone 32 to a separate digester (not shown). Optionally, the primary reactor zone 32 may also include an outlet and pump 80 for recycling waste sludge or MLSS back to the selector zone 30. As such, the nitrified sludge or MLSS is returned to the anoxic selector for denitrification. The recycled sludge, once returned back to the selector zone 30 can also be used to seed incoming sludge.

In one embodiment, the system 10 of the present invention is designed to retain all bio solids and, thus, minimize the management of biomass in an activated sludge system. The system 10 can be self-balancing. As such, an operator does not have to measure the amount of solids generated, the concentration of the solids in the reactor 12 or the return rate of solids from the primary reactor zone 32 in order to maintain a given population of organisms.

The second bio media zone 33 is the zone occupied by the second bio media 16. Like the first bio media zone 31, this zone 33 acts as a permeable or porous hydraulic barrier. As illustrated in FIGS. 2-5, the second bio media 16 is submerged in the wastewater such that the top of the second bio media 16 is located at a level at or near the bottom water level BWL. Wastewater passing through this zone 31 either passes above or through the second bio media 16. The second bio media zone 33 is adapted for retaining solids from the wastewater within the primary reactor zone 32 and the second bio media zone 33. As discussed below, the barrier provided by the second bio media 16 is particularly beneficial and forces the decanter 70 to primarily skim treated wastewater from the top of the reactor 12. Settled solids are generally trapped in the primary reactor zone 32 and are prevented from drifting to the decanter 70 or being swept out vertically by high decant rates. To the extent that any liquid is removed from below the bottom water level BWL (i.e., below the top of the second bio medium 16), that liquid will have passed through the second bio media 16 which, again, acts as a permeable hydraulic barrier and filtration device to remove solids from the wastewater. It will be further understood that the system 10 may include more than one subsequent bio media zone 33 near the outlet end 22 of the reactor 12.

The decanter zone 34 is located downstream of the second bio media zone 33. This zone 34 includes an outlet through which the treated wastewater or other liquid is discharged from the reactor 12. In one embodiment, the outlet comprises a decanter 70 for removing clarified and treated water from a top portion of the reactor 12 at a high rate. As shown in FIG. 1, the decanter 70 may include a plurality of orifices 72 for collecting the treated wastewater from the reactor 12. As shown in FIGS. 2-5, the orifices 72 are positioned at a height generally equal to the height of the bottom water level BWL (i.e., the height equal to the top of the second bio media 16). The decanter 70 further includes a pipe or conduit 74 through which the treated wastewater is discharged in an effluent stream as depicted by arrow 76. The decanter 70 may be a fixed decanter mounted to the outlet end 22 of the reactor or may be a floating decanter. Additionally, the decanter 70 may be a fixed rate or variable rate decanter. As will be appreciated, other types of outlets may also be used. The decanter zone 34 may comprise between approximately 5% and 30% of the overall reactor 12.

Though not shown, the system 10 may further include an optional polishing pond or maturation lagoon for solids capture to reduce effluent biological oxygen demand (BOD) and suspended solids (SS) within the treated wastewater. In such an embodiment, the effluent discharged from the reactor 12 would be introduced to the polishing pond. The polishing pond may further be used in sludge management if no sludge waste is removed from reactor via pump 78. When no waste sludge is removed from the reactor 12, sludge and MLSS can build in the reactor 12 and the reactor 12 may take on a high degree of stabilization. When then reactor 12 reaches an equilibrium solids concentration, a large percentage of solids exit with the effluent equal to the net biomass growth. In such a case, the polishing pond is in place to separate those solids from the effluent. Systems that do not include sludge pumping and wasting from the reactor 12 will generally require a larger polishing pond. Additionally, a polishing pond can provide the system 10 with flow equalization of the intermittent decanting of the treated wastewater. This equalization allows for smaller ancillary equipment, such as chlorinators or UV disinfection, as well as smaller post-aeration or subsequent filtration or subsequent biological processes. Systems 10 utilizing a lagoon-type technology will typically include a polishing pond. In another embodiment, the effluent discharged from the reactor 12 is of suitable condition to be discharged directly into a stream.

In another embodiment, the system 10 does not have a polishing pond. In this embodiment, the decanter 70 may be designed to prevent the entry or accumulation of solids when the decanter is opened or operated. In this design, the reactor 12 may include an outlet and a waste activated sludge (WAS) pump 78 for removing waste sludge and MLSS from the reactor 12 to a separate digester (not shown), sludge-holding tank (not shown) or solids disposal or management system (not shown). Systems 10 utilizing a concrete-type tank will typically include a decanter 70 and waste sludge pumps 78 as described above.

With continued reference to the figures, the bio media 14 and 16 may be used with an aeration system 18 adapted for mixing and aerating the wastewater. The aeration system 18 may comprise a plurality of diffusers 64. In the case of suspended diffusers, the aeration system 18 may include a floating air lateral (pipe) 60 which is located at the water level and is secured in place at its opposite ends. One or both ends of each air lateral 60 receives air under pressured air from a pump or blower 57 via a main air supply line 58. The aeration devices may take the form of submerged tubular diffusers that may be suspended from the air lateral 60 on flexible hoses 62. The diffusers 64 are preferably located slightly above the bottom 28 of the reactor 12 and function in a well-known manner to diffuse air into the liquid in the reactor 12 in the form of fine bubbles which provide aeration and circulation of the liquid. In one embodiment, at least one diffuser 64 is located proximate either one or both of the first and second bio media 14 and 16. More specifically, at least one diffuser may be located underneath or directly to the side of the lower ends 50 of the first and second bio media 14 and 16. The diffusers may be adapted for promoting the shaking or flexing of the bio media 14 and 16 when activated in order dislodge excessive biomass therefrom, thus preventing the bio media 14 and 16 from excessive biomass accumulation, clogging unduly and inhibiting the flow of wastewater therethrough. It should be understood that other types of aeration devices can be employed in connection with the bio media 14 and 16, including floor mounted or surface mounted aerators. The diffusers 64 may be selectively operated (supplied with air) in order to aerate the liquid at such times and such intensities and durations as appropriate for the particular result that is desired.

The present invention is also directed to a method for treating wastewater or other liquid in order to reduce its solids content, biological oxygen demand and/or nitrogenous content. In one embodiment, the method includes four steps or phases, as each illustrated in FIGS. 2-5, respectively. Each of the four phases are undertaken in at least the primary reaction zone 32 and may also occur, in whole or in part, in other zones of the reactor 12. The four phases include a fill phase/react (shown in FIG. 2), a reaction or aeration phase (shown in FIG. 3), a settling phase (shown in FIG. 4) and a draw or decanting phase (shown in FIG. 5). In one embodiment, the time for carrying out one cycle of the method is less than 15 hours and in another embodiment, it is less than five hours. In yet another embodiment, the filling and aeration stages both occur within a single two-hour period, the settling phase occurs within a one-hour period and the decanting phase occurs within a one-hour period. The duration of these phases may be varied, based on factors such as the influent load and the amount of treatment required in order to meet regulatory standards. It will further be understood that the system 10 is suitable for managing continuous inflow while undergoing intermittent discharge or withdrawal from the reactor 12.

Figure 2:
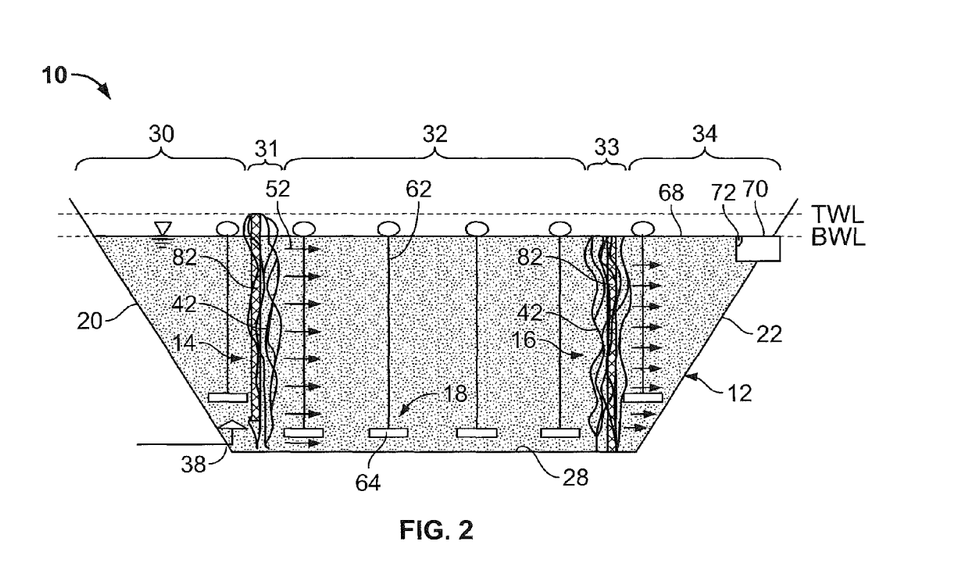
FIG. 2 is a cross sectional side view of a wastewater treatment system wherein wastewater is being introduced into the reactor during a fill phase in accordance with one embodiment of the present invention.

During the fill phase, influent wastewater to be treated is introduced into the reactor 12. As set forth above, the influent wastewater may be introduced to the reactor 12 via an inlet located 38 located proximate the reactor's inlet end 20. During the fill phase, the level of the liquid in the reactor 12 may rise from a bottom water level BWL to a top water level TWL. As the influent wastewater is introduced into the reactor 12, a portion of the water passes through the first bio media 14. Due to the first bio media's 14 baffling capabilities, this may occur in a generally uniform fashion, as represented by arrows 52. While passing through the first bio media 14, the wastewater is exposed to the fixed film microbial biomass that grows and accumulates on the individual strips 44 or other elements of the bio media 14 such that the microbes are able to remove suspended solids and soluble organics from the wastewater. It will be appreciated that the influent wastewater may be pre-treated prior to be introduced to the reactor 12, for example, through screening and/or settling to remove gross solids and organics therefrom or through chemical or thermal treatment in a manner known to those of skill in the art.

Figure 3:
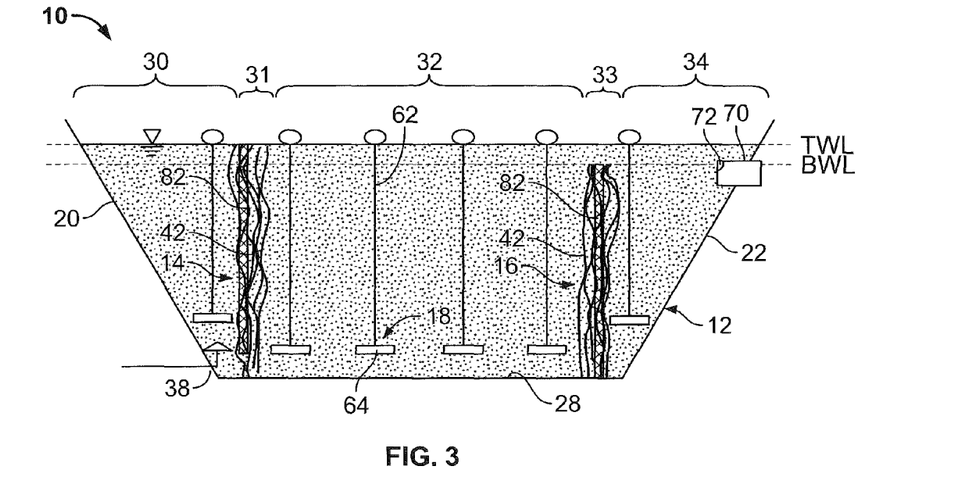
FIG. 3 is a cross sectional side view of a wastewater treatment system wherein wastewater is being aerated and mixed in the reactor during an aeration phase in accordance with one embodiment of the present invention.

During the aeration phase, some or all of the diffusers 64 are activated. The aeration system 18 may be pulsed or sequenced on a timed cycle in order to achieve aerobic and anoxic conditions on a temporal or continuous basis within the reactor 12. The aerating and mixing of the wastewater is undertaken, in part, to reduce the biological oxygen demand of the water and convert at least a portion of the nitrogenous components to nitrate components. As set forth above, the aeration system 18 includes a pump 57 for supplying air, oxygen or enriched oxygen to the diffusers 64 located at the bottom of the reactor 12. As will be appreciated, during the aeration phase, the liquid will be both aerated and mixed.

Figure 4:
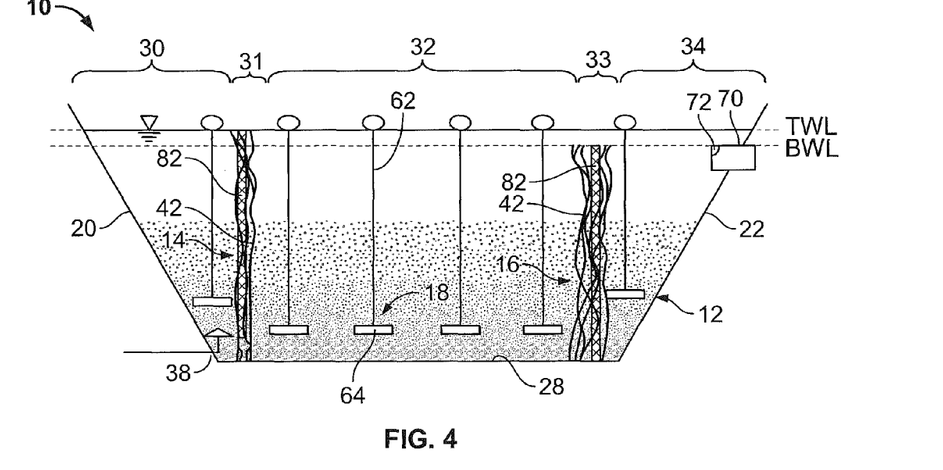
FIG. 4 is a cross sectional side view of a wastewater treatment system wherein wastewater is held in quiescent state and solids are settling towards a lower portion of the reactor during a settling phase in accordance with one embodiment of the present invention.

Upon termination of air or oxygen being supplied through the aerators 64, the settling phase commences. During the settling phase, the wastewater is maintained in a quiescent state such that the solids within the water will settle toward the bottom of the reactor 12 as illustrated in FIG. 4. Meanwhile, the clarified liquid is maintained toward the top of the reactor 12. Thus, the liquid forms a clarified upper layer with a stratified lower layer containing a high concentration of solids including the treatment microorganisms. Chemicals, such as flocculants and coagulants, are not normally required but can be added to the wastewater before or during the settling phase to assist in the solids/liquid separation. In the interest of time, the settling phase will be terminated prior to all of the possible solids reaching the bottom of the reactor 12.

Figure 5:
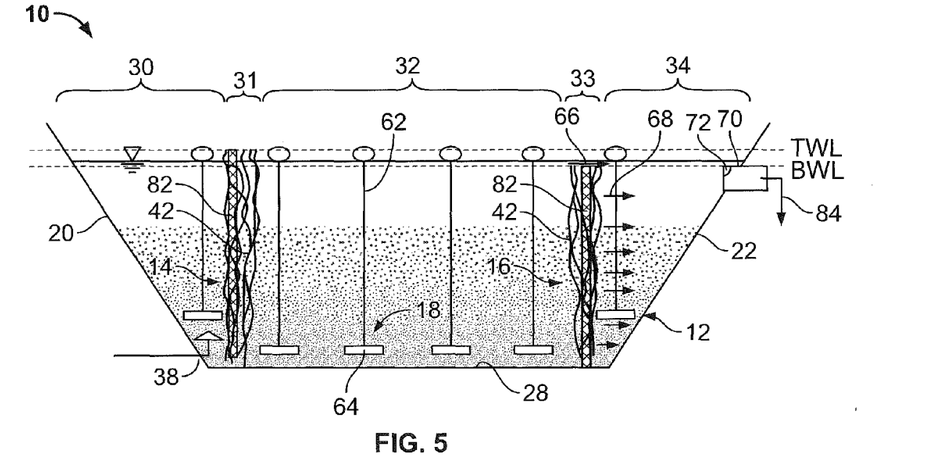
FIG. 5 is a cross sectional side view of a wastewater treatment system wherein treated and clarified wastewater is removed from an upper portion of the reactor during a decanting phase in accordance with one embodiment of the present invention.

Once a sufficient amount of solids settle or trend toward the bottom of the reactor 12, or least below the bottom water level BWL (i.e., below the top of the second bio media 16), the decanting phase may begin. During the decanting phase, clarified liquid is withdrawn from the reactor 12. The treated effluent may be withdrawn from the reactor 12 via a decanter 70 or other outlet device. Due to the placement of the decanter in conjunction with the second bio media 16, the decanter 70 skims only the top clarified layer of treated liquid from the reactor 12. As depicted in FIG. 5, during the decanting phase, the treated effluent passes either above or through the second bio media 16. In one embodiment, the majority of the clarified liquid removed from the reactor 12 passes over the second bio media 16 as indicated by arrow 66. To the extent that a portion of the clarified liquid is removed from behind the second bio media 16, that liquid first passes through (as opposed to over) the second bio media 16 as indicated by arrows 68. Thus, in one embodiment, a high percentage of the treated wastewater is drawn off the top of the reactor 12, while a smaller percentage is drawn from behind the second bio media 16. The second bio media 16 traps solids in the primary reactor zone 32, prevents them from drifting to the decanter, shields them from the decant velocity and prevents them from being swept out vertically by high decant rates. To the extent that a portion of the treated wastewater passes through (as opposed to over) the second bio media 16, the second bio media 16 functions as a biological flocculation and filtering device to further treat the water passing therethrough. The effluent that goes through the second bio media are of a generally good and acceptable quality and can be discharged without the loss of solids that would occur in a system not having the second bio media 16. As set forth above, depending upon the condition of the treated wastewater or other liquid withdrawn from the reactor 12, it may be discharged to a stream, river, polishing pond, further treatment system or other body of water. It may also undergo disinfection filtration or other processes prior to being released.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A wastewater treatment system comprising:
   a reactor having an inlet end, an outlet end, a left side, a right side and a floor;
   an inlet proximate said reactor inlet end for introducing wastewater to said reactor;
   a first bio medium generally submerged and extending substantially between said reactor left and right sides and extending substantially between a top water level and said reactor floor, said first bio medium being a permeable hydraulic barrier adapted for allowing said wastewater to flow generally uniformly therethrough;
   an aeration system adapted for mixing and aerating said wastewater;
   a second bio medium generally submerged and extending substantially between said reactor left and right sides and extending substantially between a bottom water level and said reactor floor such that a top of said second bio medium is located at a height generally equal to a height of said bottom water level, said second bio medium being a permeable hydraulic barrier adapted for allowing said wastewater to flow therethrough; and
   an outlet proximate said reactor outlet end for discharging treated wastewater from said reactor, said outlet including an orifice positioned at a height generally equal to said height of said top of said second bio medium and said height of said bottom water level such that said orifice is positioned for withdrawing treated wastewater from an upper portion of said reactor located above said top of said second bio medium, wherein a majority of said treated wastewater discharged from said reactor passes over said top of said second bio medium.

2. A wastewater treatment system as set forth in claim 1 further comprising a pre-react or selector zone located between said reactor inlet end and said first bio medium, a primary reactor zone located between said first bio medium and said second bio medium and a discharge or decanter zone located between said second bio medium and said outlet end; wherein said pre-react or selector zone, said primary reactor zone, and said discharge or decanter zone are located in a single said reactor and are separated by permeable hydraulic barriers.

3. A wastewater treatment system as set forth in claim 1, wherein said first bio medium acts as a baffle causing wastewater to flow generally uniformly into a primary reactor zone located between said first bio medium and said second bio medium.

4. A wastewater treatment system as set forth in claim 1, wherein said first and second bio medium each form a substantially continuous curtain across substantially the entirety of the width of said reactor.

5. A wastewater treatment system as set forth in claim 1, wherein said outlet comprises a decanter adapted for withdrawing treated wastewater from a top portion of said reactor.

6. A wastewater treatment system as set forth in claim 5, wherein at least one of said first bio medium and said second bio medium is a biological flocculation and filtering device suitable for permitting microbial biomass to grow and accumulate thereon and being further adapted to prevent or trap solids from passing therethrough.

7. A wastewater treatment system as set forth in claim 6, wherein said second bio medium is adapted for retaining said solids within a primary reactor zone located between said first bio medium and said second bio medium.

8. A wastewater treatment system as set forth in claim 6, wherein said treated wastewater generally passes either above or through said second bio medium prior to being withdrawn from said reactor.

9. A wastewater treatment system as set forth in claim 1, wherein said first bio medium and said second bio medium are characterized by the ability to promote the growth and accumulation of microbes thereon.

10. A wastewater treatment system as set forth in claim 1, wherein said first bio medium and said second bio medium each comprise a plurality of flexible strips arranged in the form of a cluster having a thickness.

11. A wastewater treatment system as set forth in claim 1, wherein said first bio medium and said second bio medium each comprise a rigid medium or large number of small rigid media retained in a containment cage or structure.

12. A wastewater treatment system as set forth in claim 1, wherein said aeration system comprises a plurality of diffusers, at least one of said diffusers being located proximate at least one of said first bio medium and said second bio medium, said at least one diffuser adapted for promoting the flexing of said at least one of said first bio medium and second bio medium for dislodging excessive biomass therefrom.

13. A wastewater treatment system as set forth in claim 12, wherein said at least one diffuser is located proximate said floor.

14. A wastewater treatment system as set forth in claim 1, wherein said reactor is a lagoon.

15. A wastewater treatment system as set forth in claim 1, wherein said reactor includes generally vertical concrete side walls.

16. A wastewater treatment system as set forth in claim 1 further comprising a sludge pump for removing sludge from said reactor or moving sludge within said reactor.

17. A method for treating wastewater, said method comprising the steps of:
    introducing influent wastewater to be treated into a reactor;
    passing said wastewater through a first bio medium, said first bio medium being a permeable hydraulic barrier adapted for allowing said wastewater to flow generally uniformly therethrough;
    mixing and aerating said wastewater in an treatment zone to reduce the biological oxygen demand of said wastewater and to convert at least a portion of nitrogenous components to nitrate or nitrite components;
    maintaining said wastewater in said treatment zone in a quiescent state to form a clarified upper layer and a stratified lower layer containing waste solids including treatment microorganisms;
    passing at least a portion of said wastewater above a top of second bio medium extending generally between a bottom water level and a floor of said reactor such that said top of said second bio medium is located at a height generally equal to a height of said bottom water level, said second bio medium being a permeable hydraulic barrier adapted for allowing said wastewater to flow therethrough and from preventing solids from passing therethrough; and
    removing a predetermined portion of the clarified upper layer as a treated effluent stream having reduced solids content, reduced biological oxygen demand and reduced nitrogenous content with respect to said influent wastewater, said predetermined portion of said clarified upper layer being removed through an orifice positioned at a height generally equal to said height of said top of said second bio medium and said height of said bottom water level and adapted for withdrawing said clarified upper layer from an upper portion of said reactor located above said top of said second bio medium, wherein a majority of said treated effluent stream removed from said reactor passes over said top of said second bio medium.

18. A method for treating wastewater as set forth in claim 17, further comprising the step of introducing said treated effluent stream into a polishing pond for solids capture to further reduce biological oxygen demand and suspended solids.

19. A method for treating wastewater as set forth in claim 18, wherein said polishing pond is adapted for managing sludge released from said reactor.

20. A method for treating wastewater as set forth in claim 17, further comprising the step of pumping waste sludge from said reactor to at least one of a sludge holding tank, a sludge digester and a sludge management system.

21. A wastewater treatment system as set forth in claim 1, wherein said first bio medium and said second bio medium are each a permeable hydraulic barrier adapted for preventing solids from passing therethrough.

22. A wastewater treatment system as set forth in claim 1, wherein said inlet is proximate said floor.

23. A wastewater treatment system as set forth in claim 1, wherein at least one of said first bio medium and said second bio medium includes a plurality of flexible elements arranged in at least one cluster and wherein said at least one cluster extends in a substantially continuous curtain across substantially the entirety of a width of said reactor.

24. A wastewater treatment system as set forth in claim 23, wherein said elements hang downwardly from a cable and have a lower free end.

25. A wastewater treatment system as set forth in claim 1, wherein the flow of said wastewater through said first bio medium is generally uniform across a horizontal length of said first bio medium extending between said reactor left and right sides.

26. A wastewater treatment system as set forth in claim 1, wherein said aeration system is sequenced on a cycle in order to achieve both aerobic conditions and anoxic conditions on a temporal basis within a single said reactor.

27. A wastewater treatment system as set forth in claim 26, wherein both a reduction in biological oxygen demand and a conversion of at least a portion of nitrogenous components to nitrate components occur in a single said reactor.

* * * * *